United States Patent [19]

Trop et al.

[11] 4,338,347
[45] Jul. 6, 1982

[54] POWDERED COMPOSITIONS FOR MOUSSE PRODUCTS

[75] Inventors: Moshe Trop; Avinoam Livne, both of Beer Sheva, Israel

[73] Assignee: Ben-Gurion University of the Negev Research and Development Authority, Beer Sheva, Israel

[21] Appl. No.: 190,134

[22] Filed: Sep. 24, 1980

[30] Foreign Application Priority Data

Sep. 28, 1979 [IL] Israel .......................................... 58362

[51] Int. Cl.$^3$ ................................................ A23G 9/02
[52] U.S. Cl. ...................................... 426/565; 426/572
[58] Field of Search ............... 426/564, 570, 566, 572, 426/565–564

[56] References Cited

U.S. PATENT DOCUMENTS 3,365,305 1/1968 Hunter .................................. 426/570
3,656,972 4/1972 Blomberg ............................. 426/572
4,251,560 2/1981 Dell et al. ............................ 426/570

Primary Examiner—Jeanette M. Hunter
Attorney, Agent, or Firm—Pollock, Vande Sande & Priddy

[57] ABSTRACT

The invention provides a powdered composition for mixing with a liquid to obtain a mousse product, comprising, by weight proportions, about 30 to about 50 parts of a vegetable lipid whipping agent, about 5 to 15 parts milk powder, about 30–60 parts sugar, about 30 to 10 parts of a texture stabilizer and about 0.05 to 10 parts flavor additives, wherein the lipid whipping agent comprises about 15 to 35% of sugar or corn syrup solids, about 6 to 11% sodium caseinate and about 50 to 70% of a lipid component, which lipid component comprises about 75 to 85% partially hydrogenated vegetable oil, about 10 to 12% lactylated fatty acid esters of glycerol and propylene glycol and about 8 to 10% of fatty acid mono or diglycerides.

16 Claims, No Drawings

POWDERED COMPOSITIONS FOR MOUSSE PRODUCTS

The present invention relates to powdered compositions suitable for mixing with a liquid such as cold milk, cold water or cold juice to obtain a mousse product.

The most commonly recognized mousse product is milk based chocolate, vanilla or strawberry flavored dessert in which air is dispersed in a continuous phase. Similarly, the cream filling placed between the flaked cake layers of Napoleon cakes is also a mousse product.

As known by any housewife or restaurant owner, the preparation of a chocolate mousse dessert of good flavor and texture or of a Napoleon cake is a difficult and time consuming proposition.

Thus, the present invention comes to provide powdered compositions having extremely long shelf-lives which can at a moment's notice be taken and combined with liquid to produce a mousse product, which mousse product itself, when protected from bacterial degeneration and refrigerated, will remain stable and edible for several days.

Accordingly, the present invention provides a powdered composition suitable for mixing with a liquid to obtain a mousse product, comprising, by weight proportions, about 30 to about 50 parts of a vegetable lipid whipping agent, about 5 to 15 parts milk powder, about 30-60 parts sugar, about 3 to 10 parts of a texture stabilizer and about 0.05 to 10 parts flavor additives, wherein said lipid whipping agent comprises about 15 to 35% of sugar or corn syrup solids, about 6 to 11% sodium caseinate and about 50 to 70% of a lipid component, which lipid component comprises about 75 to 85% partially hydrogenated vegetable oil, about 10 to 12% lactylated fatty acid esters of glycerol and propylene glycol and about 8 to 10% of fatty acid mono or diglycerides.

The vegetable lipid whipping agent which forms one ingredient of the compositions of the present invention and which will be described in more detail hereinafter has been developed to replace cream for making instant aerated products without the storing and handling disadvantages of fresh cream as a manufacturing ingredient. Said whipping agent has a neutral taste and whippable properties but cannot be overwhipped.

The milk powder component of the present composition can be whole milk powder or skim milk powder and especially preferred is spray-dried skim-milk powder because of its longer shelf-life.

The texture stabilizers of the present composition can be any such products known in the art and preferred ingredients are precooked starch, instant gelatine, calcium lactate and tetrasodium pyrophosphate. Especially preferred is a combination of texture stabilizers in which precooked starch is the main stabilizer and minor amounts of calcium lactate and tetrasodium pyrophosphate are added thereto to give further firmness to the mousse product.

As will be realized, a wide variety of natural and artificial flavors can be added to the above components in accordance with the nature of the final product desired. Thus, e.g., cocoa can be added to create a chocolate mousse product, instant coffee can be added to create a mocca mousse product, vanilla flavor can be added to create a vanilla mousse product, etc.

While the relative proportions of component ingredients has been expressed in terms of proportional parts by weight, another way of expressing said relationship is in terms of gram amounts of components in a single batch of powder suitable for mixing with about 200 ml of liquid to produce the desired mousse product.

Thus, an especially preferred embodiment of the present invention can be characterized as comprising about 38 to 42 g vegetable liquid whipping agent, about 8 to 12 g skim milk powder, about 35 to 45 g sugar, about 7 to 10 g cocoa, about 7 to 8 g precooked starch, about 0.1 to 0.2 g calcium lactate and about 0.1 g to 0.2 g tetrasodium pyrophosphate.

Two other preferred compositions involve the same formulation with about 0.05 to 0.25 g vanilla flavor or about 1 to 3 g instant coffee respectively substituted for the above-mentioned cocoa.

The mousse product itself is simply prepared by whipping together about 200 ml of cold liquid, i.e., milk, water or juice and said powdered compositions.

For preparing the cream filling for napoleon cake, the higher range of powdered components to liquid is preferred.

The invention will now be described in connection with certain preferred embodiments in the following examples so that it may be more fully understood. It is not, however, intended to limit the invention to these particular embodiments. On the contrary, it is intended that all alternatives, modifications and equivalents as may be included within the scope of the invention as defined by the appended claims be included herein. Thus, the following examples which include preferred embodiments will serve only to illustrate the practice of this invention, it being understood that the particular formulations described are by way of example and for purposes of illustrative discussion of preferred embodiments of the present invention only and are presented in the cause of providing what is believed to be the most useful and readily understood description of formulation procedures as well as of the principles and conceptual aspects of the invention.

Before discussing several preferred examples of compositions prepared according to the present invention, the manner of preparation of the vegetable lipid whipping agents usable therein will now be presented.

First an aqueous solution containing about 50 to about 70% sugar or corn syrup solids and 18 to about 22% sodium caseinate is heated to about 48°–50° C. There is separately prepared a lipid composition composed of about 75 to 85% partially hydrogenated vegetable oil, e.g., palm kernel, coconut, cottonseed oil, etc., having a wetting point of about 30°–50° C., about 10 to 12% lactylated fatty acid esters of glycerol and propylene glycol and about 8 to 10% of fatty acids mono and/or diglycerides. Said aqueous and lipid solutions are then combined in a 1:1 to 3:7 ratio to form an emulsion suspension the temperature of which is raised to 75° C. for 30 minutes after which the dispersion is homogenized and spray dried to form the dry lipid whipping agent used in the examples hereinafter.

EXAMPLE 1

| Firm Chocolate Mousse | |
|---|---|
| Lipid whipping agent | 40 g |
| Sugar | 40 g |
| Skim milk powder | 10 g |
| Cocoa | 10 g |
| Precooked starch | 7.5 g |
| Calcium lactate | 0.17 g |
| Tetrasodium pyrophosphate | 0.17 g |

-continued

| Firm Chocolate Mousse | |
|---|---|
| Chocolate flavor | 0.3 g |

The above dry powder compositions was whipped together with 200 ml cold water and a volume increase of about 2½ times was noted. The resulting chocolate mousse had excellent taste and firm texture which remained under refrigeration conditions for several days.

EXAMPLE 2

| Soft Chocoate Mousse | |
|---|---|
| Lipid whipping agent | 42 g |
| Sugar | 40 g |
| Skim milk powder | 10 g |
| Cocoa | 8 g |
| Precooked starch | 8 g |

The above dry mixture was whipped together with 200 ml cold milk and a volume increase of more than 2½ times was noted. The resulting mousse which was of less firm texture than that produced by example 1 had excellent taste and also remained stable under refrigeration conditions for several days.

EXAMPLE 3

| Vanilla Mousse Powder | |
|---|---|
| Lipid whipping agent | 38 g |
| Sugar | 35 g |
| Skim milk powder | 8 g |
| Precooked starch | 7.5 g |
| Calcium lactate | 0.17 g |
| Tetrasodium pyrophosphate | 0.17 g |
| Vanilla | 0.1 g |
| Yellow color | 0.025 g |
| Cream flavor | 0.05 g |

EXAMPLE 4

| Mocca Mousse Powder | |
|---|---|
| Lipid whipping agent | 43 g |
| Sugar | 42 g |
| Skim milk powder | 11 g |
| Instant gelatine | 8 g |
| Coffee color | 0.02 g |
| Cream flavor | 0.05 g |
| Instant coffee | 1.5 g |
| Mocca flavor | 10 mg |

EXAMPLE 5

| Cream Filling for Napoleon Cake | |
|---|---|
| Lipid whipping agent | 50 g |
| Sugar | 55 g |
| Whole milk powder | 15 g |
| Precooked starch | 9 g |
| Calcium lactate | 0.22 g |
| Tetrasodium pyrophosphate | 0.22 g |
| Vanilla flavor | 0.2 g |
| Yellow color | 0.02 g |

The above dry mixture was whipped with 200 ml orange juice and the resulting mousse cream filling was spread between layers of flaky puff pastry to produce a tangy and delicious napoleon cake.

It will be evident to those skilled in the art that the invention is not limited to the details of the foregoing illustrative embodiments and that the present invention may be embodied in other specific forms without departing from the essential attributes thereof, and it is, therefore, desired that the present embodiments and examples be considered in all respects as illustrative and not restrictive, reference being made to the appended claims, rather than to the foregoing description, and all changes which come with the meaning and range of equivalency of the claims are, therefore, intended to be embraced therein.

What is claimed is:

1. A powdered composition suitable for mixing with a liquid to obtain a mousse product, comprising, by weight proportions, about 30 to about 50 parts of a vegetable lipid whipping agent, about 5 to 15 parts milk powder, about 30–60 part sugar, about 3 to 10 parts of a texture stabilizer and about 0.05 to 10 parts flavor additives, wherein said lipid whipping agent comprises about 15 to 35% of sugar or corn syrup solids, about 6 to 11% sodium caseinate and about 50 to 70% of a lipid component, which lipid component comprises about 75 to 85% partially hydrogenated vegetable oil, about 10 to 12% lactylated fatty acid esters of glycerol and propylene glycol and about 8 to 10% of fatty acid mono or diglycerides or mixture of said mono and diglycerides.

2. A powdered composition according to claim 1 wherein said texture stabilizer is precooked starch.

3. A powdered composition according to claim 1 wherein said texture stabilizer is instant gelatine.

4. A powdered composition according to claim 1 wherein said texture stabilizer comprises precooked starch in combination with calcium lactate and tetrasodium pyrophosphate.

5. A powdered composition according to claim 1 comprising about 7 to 10 parts cocoa as said flavor additive.

6. A powdered composition according to claim 1 comprising about 0.05 to 0.25 parts vanilla flavor as said flavor additive.

7. A powdered composition according to claim 1 comprising about 1 to 3 parts instant coffee as said flavor additive.

8. A powdered composition according to claim 1 wherein said milk powder is whole milk powder.

9. A powdered composition according to claim 1 wherein said milk powder is skim milk powder.

10. A powdered composition according to claim 1 suitable for mixing with a liquid to obtain a mousse product, said composition comprising, per 200 ml liquid, about 38 to 42 g lipid whipping agent, about 8 to 12 g skim milk powder, about 35 to 45 g sugar, about 7 to 10 g cocoa, about 7 to 8 g pre-cooked starch, about 0.1 to 0.2 g calcium lactate and about 0.1 to 0.2 g tetrasodium pyrophosphate.

11. A mousse product produced by whipping together about 200 ml of cold liquid and the powdered composition of claim 1 and subsequently refrigerating.

12. A mousse product according to claim 11 wherein said liquid is selected from the group consisting of cold milk, cold water and cold juice.

13. The powdered composition of claim 1 wherein said partially hydrogenated vegetable oil has a wetting point of about 30°–50° C.

14. The powdered composition of claim 13 wherein said partially hydrogenated vegetable oil is from an oil selected from the group of palm kernel oil, coconut oil or cottonseed oil.

15. The powdered composition of claim 1 wherein said lactylated fatty acid esters are esters of glycerol and propylene glycol.

16. The powdered composition of claim 1 wherein said milk powder is spray-dried skim milk powder.

* * * * *